United States Patent
Tremblay et al.

(10) Patent No.: US 8,475,542 B2
(45) Date of Patent: Jul. 2, 2013

(54) BIODIESEL PRODUCTION USING ULTRA LOW CATALYST CONCENTRATIONS IN A MEMBRANE REACTOR

(75) Inventors: André Yves Tremblay, Ottawa (CA); Marc Arnold Dubé, Ottawa (CA); Peigang Cao, Sarnia (CA)

(73) Assignee: University of Ottawa Technology Transfer and Business Enterprise, Ottawa, Ontario (CA)

( * ) Notice: Subject to any disclaimer, the term of this patent is extended or adjusted under 35 U.S.C. 154(b) by 324 days.

(21) Appl. No.: 12/779,541

(22) Filed: May 13, 2010

(65) Prior Publication Data

US 2010/0307051 A1 Dec. 9, 2010

Related U.S. Application Data

(63) Continuation-in-part of application No. PCT/CA2008/002068, filed on Nov. 24, 2008.

(60) Provisional application No. 60/989,883, filed on Nov. 23, 2007.

(51) Int. Cl.
*C10L 1/18* (2006.01)

(52) U.S. Cl.
USPC ............................................. 44/388; 554/174

(58) Field of Classification Search
USPC ............................................. 44/388; 554/174
See application file for complete search history.

(56) References Cited

U.S. PATENT DOCUMENTS

| | | | |
|---|---|---|---|
| 2,383,580 A | * | 8/1945 | Arrowsmith et al. ......... 554/167 |
| 4,229,297 A | | 10/1980 | Nohmi et al. |
| 4,655,927 A | | 4/1987 | Ford |
| 5,908,946 A | | 6/1999 | Stern et al. |
| 5,972,057 A | | 10/1999 | Hayafuji |
| 6,262,285 B1 | | 7/2001 | McDonald |
| 6,620,958 B2 | | 9/2003 | Buchanan et al. |

(Continued)

FOREIGN PATENT DOCUMENTS

| | | |
|---|---|---|
| CA | 2552371 | 7/2005 |
| CN | 1648207 | 8/2005 |

(Continued)

OTHER PUBLICATIONS

European Patent Application No. 06705240.7, Search Report dated Feb. 24, 2009.

(Continued)

*Primary Examiner* — Cephia D Toomer
(74) *Attorney, Agent, or Firm* — Kathleen E. Marsman; Borden Ladner Gervais LLP

(57) ABSTRACT

A method for producing a fuel or fuel additive comprising providing a reaction mixture comprising oil and an alcohol in an oil-in-alcohol emulsion and a catalyst for converting the oil to the fuel or the fuel additive. The oil and the alcohol are reacted in the presence of the catalyst, at a concentration below that used in a conventional batch process, to produce the fuel or fuel additive. This low level of catalyst reduces the formation of diols and oxidation products that can diminish the quality of the fuel or fuel additive. The fuel or fuel additive produced is continuously removed during the reaction, effectively de-coupling the concentration of catalyst used from the rate of the two phase reaction.

20 Claims, 14 Drawing Sheets

U.S. PATENT DOCUMENTS

| | | | |
|---|---|---|---|
| 7,622,600 B1 * | 11/2009 | Marr | 554/161 |
| 8,039,652 B2 * | 10/2011 | Portnoff et al. | 554/169 |
| 2002/0013486 A1 | 1/2002 | Ergun et al. | |
| 2005/0011112 A1 | 1/2005 | Khalil et al. | |
| 2005/0027137 A1 * | 2/2005 | Hooker | 554/176 |
| 2006/0063242 A1 | 3/2006 | Chou | |
| 2008/0250700 A1 | 10/2008 | Tremblay et al. | |

FOREIGN PATENT DOCUMENTS

| | | |
|---|---|---|
| WO | 9317566 | 9/1993 |
| WO | 2006089429 | 8/2006 |
| WO | 2009065229 | 5/2009 |

OTHER PUBLICATIONS

International Patent Application No. PCT/CA2008/002068, Search Report dated Feb. 6, 2009.

International Patent Application No. PCT/CA2006/000286, Search Report dated Jun. 13, 2006.

Ma et al., "Biodiesel Production: A Review", Bioresource Technology, vol. 70, Oct. 1999, pp. 1-15.

Clements et al., "The effects of catalyst free fatty acids, and water on transesterification of beef tallow", American Society of Agricultural and Biological Engineers, 1998, vol. 41, No. 5, pp. 1261-1264.

Dasari et al. "Noncatalytic Alcoholysis Kinetics of Soybean Oil", Journal of American Oil Chemical Society, Feb. 2003, vol. 80, No. 2, pp. 189-192.

Kusdiana et al., "Kinetics of transesterification in rapeseed oil to biodiesel fuel as treated in supercritical methanol", Fuel, Apr. 2001, vol. 80, pp. 693-698.

Kusdiana et al., "Methyl esterification of free fatty acids of rapeseed oil as treated in supercritical methanol", Journal of Chemical engineering of Japan, vol. 34, No. 3, 2001, pp. 383-387.

Vicente et al., "Integrated biodiesel production: a comparison of different homogeneous catalysts systems", Bioresource Technology, vol. 92, May, 2004, pp. 297-305.

Freedman et al., "Variables affecting the yield of fatty ester from transesterified vegetable oils", Journal of American Oil Chemical Society, Oct. 1984, vol. 61, No. 10, pp. 1638-1643.

Peterson et al., "Optimization of a Batch Type Ethyl Ester Process", Ethyl Ester Process Scale-up and Biodegradability of Biodiesel, Final Report, Nov. 1996, No. 303, 12 pages.

Markolwitz, "Consider Europe's most popular catalyst", Biodiesel Magazine, May/Jun. 2004 issue, 2 pages.

Schwab et al., "Preparation and properties of diesel fuels from vegetables oils", Fuel, Oct. 1987, vol. 66, pp. 1372-1378.

Canakci et al., "Biodiesel production via acid catalysis", Transactions of American Journal of Agricultural Engineering, vol. 42, No. 5, 1999, pp. 1203-1210.

Knothe et al., "The Biodiesel Handbook", AOCS Press: Champaign, Illinois, Jan. 30, 2005, pp. 40-61.

Cao et al., "Methanol Recycling in the Production of Biodiesel in a Membrane Reactor", Fuel, May 2008, vol. 87, pp. 825-833, available on line Jul. 2, 2007.

Suppes et al., "Transesterification of soybean oil with zeolite and metal catalysts", Applied Catalysis. A: General, Jan. 2004, vol. 257, pp. 213-223.

Shimada et al., "Enzymatic alcoholysis for biodiesel fuel production and application of the reaction to oil processing", Journal of Molecular Catalysis B: Enzymatic, vol. 17, Jun. 2002, pp. 133-142.

Dube et al., "Biodiesel Production Using a Membrane Reactor", Bioresource Technology, vol. 98, Feb. 2007, pp. 639-647, available on line Mar. 31, 2006 www.sciencedirect.com.

Antolin et al., "Optimization of biodiesel production by sunflower oil transesterification", Bioresource Technology, Jun. 2002, vol. 83, pp. 111-114.

Dube et al., "A Comparison of Attenuated Total Reflectance-FTIR Spectroscopy and GPC for Monitoring Biodiesel Production", Journal of American Oil Chem. Soc., vol. 81, No. 6, Jun. 2004, pp. 599-603.

Cao et al., "Effect of Membrane Pore Size on the Performance of a Membrane Reactor for Biodiesel Production", Ind. Eng. Chem. Res., 2007, vol. 46, pp. 52-58, published on internet Dec. 1, 2006, American Chemical Society.

Vicente et al., "Kinetics of Sunflower Oil Methanolysis", Ind. Eng. Chem. Res., 2005, vol. 44, 5447-5454, published on the internet, American Chemical Society Jun. 2, 2005.

Lotero et al., "The Catalysis of Biodiesel Synthesis", Catalysis, 2006, vol. 19, pp. 41-83.

Zheng, D., Crystallization characteristics and fuel properties of tallow methyl esters, Master thesis, Food Science and Technology, University of Nebraska-Lincoln, May 1994, 5 pages.

Zhang et al., "Biodiesel production from waste cooking oil: 1. Process design and technological assessment", Bioresource Technology, vol. 89, Aug. 2003, pp. 1-16.

Barnwal et al., "Prospects of Biodiesel production from vegetable oils in India, Renewable and Sustainable Energy Reviews", vol. 9, Aug. 2005, pp. 363-378.

\* cited by examiner

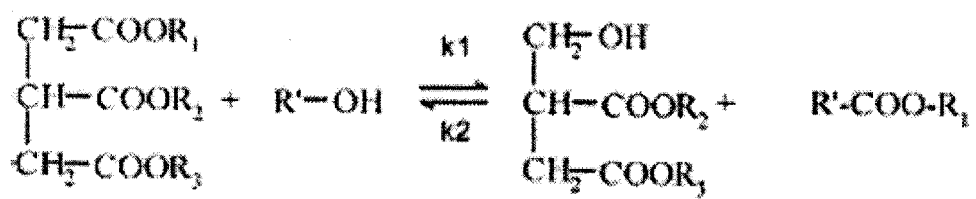
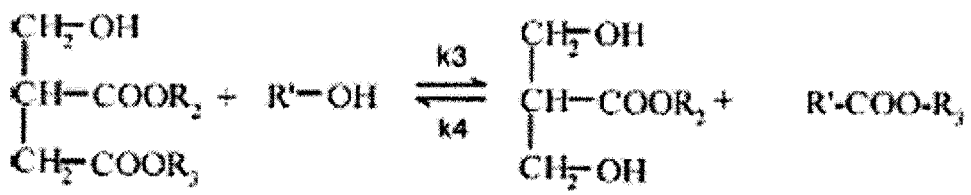
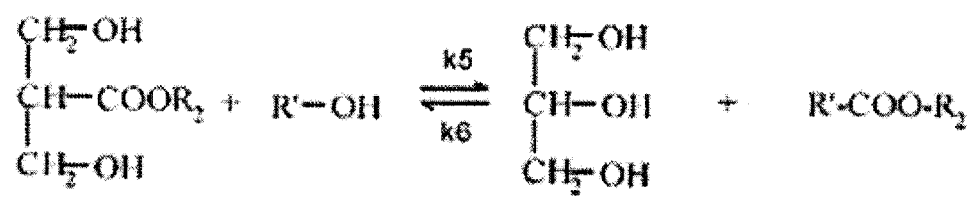
FIG. 1

| Experimental conditions used in this work. ||| 
|---|---|---|
| NaOH concentration* (% by weight of oil ) | Residence time (RT) (h) ||
| 1 | 1 ||
| 0.5 | 1 ||
| 0.1 | 1 ||
| 0.05 | 1 | 2 |
| 0.03 | 1** | 2 |
| 0.01 | 2** ||
| 0 | 2** ||
| *The oil feedstock was neutralized with NaOH prior to the run. The numbers represent the catalyst added above that required for neutralization. All feedstock was titrated using phenolphthalein as the acid-base indicator.<br>** The trans-membrane pressure (TMP) increased, indicating oil accumulation in the reactor at these operating conditions. |||

FIG. 3

| Residence time (RT) (h) | Catalyst concentration (wt% on oil basis) | Total run time (min) | Steady state TMP (kPa) | Oil remaining in reactor at the end of the run (g) | Volume fraction of oil in the reactor at the end of the run | Conversion of oil fed to the reactor (wt.%) | Conversion of oil initially in the reactor (wt.%) |
|---|---|---|---|---|---|---|---|
| 1 | 0.03 | 120 | - | 3191.16 | 0.58 | 90.0 | 0.0 |
| 1 | 0.05 | 180 | 32.3 | 1870.68 | 0.34 | 100.0 | 37.6 |
| 1 | 0.1 | 180 | 41.8 | 605.22 | 0.11 | 100.0 | 79.8 |
| 1 | 0.5 | 180 | 46.3 | 110.04 | 0.02 | 100.0 | 96.3 |
| 1 | 1 | 180 | 46.2 | 55.02 | 0.01 | 100.0 | 98.2 |
| 2 | 0 | 60 | - | 3961.44 | 0.72 | 3.1 | 0.0 |
| 2 | 0.01 | 90 | - | 3521.28 | 0.64 | 56.5 | 0.0 |
| 2 | 0.03 | 180 | 30.2 | 2096.76 | 0.38 | 100.0 | 30.3 |
| 2 | 0.05 | 180 | 29.5 | 1595.58 | 0.29 | 100.0 | 46.8 |

FIG. 5

| Residence time (RT) (h) | Catalyst concentration (wt% on oil basis) | Total run time (min) | Initial methanol in reactor (g) | Total methanol fed to the reactor during the run (g) | Initial oil in reactor (g) | Total oil fed to the reactor during the run (g) | Mass Methanol total (in reactor at start + fed during run) (g) | Mass Oil Total (in reactor at start + fed during run) (g) | Volume of Methanol total (in reactor at start + fed during run) (mL) | Volume of Oil Total (in reactor at start + fed during run) (mL) | Overall volume fraction of methanol in the reactor during the run |
|---|---|---|---|---|---|---|---|---|---|---|---|
| 1 | 0.03 | 120 | 2373 | 4740.5 | 2739 | 4394.2 | 7113.5 | 7133.2 | 9004.4 | 7838.7 | 0.535 |
| 1 | 0.05 | 180 | 2373 | 6228.3 | 2739 | 7145.5 | 8601.3 | 9884.5 | 10887.7 | 10862.1 | 0.501 |
| 1 | 0.1 | 180 | 2373 | 6096.4 | 2739 | 7929.4 | 9069.4 | 10668.4 | 11480.2 | 11723.5 | 0.495 |
| 1 | 0.5 | 180 | 2373 | 6768.8 | 2739 | 8097.5 | 9141.8 | 10836.5 | 11571.9 | 11908.2 | 0.493 |
| 1 | 1 | 180 | 2373 | 6570.1 | 2739 | 8154.2 | 8943.1 | 10893.2 | 11320.4 | 11970.6 | 0.486 |
| 2 | 0 | 60 | 2373 | 1164.3 | 2739 | 1249 | 3537.3 | 3988 | 4477.6 | 4382.4 | 0.505 |
| 2 | 0.01 | 90 | 2373 | 1701.2 | 2739 | 1770.5 | 4074.2 | 4509.5 | 5157.2 | 4955.5 | 0.510 |
| 2 | 0.03 | 180 | 2373 | 3716.3 | 2739 | 3283.8 | 6089.3 | 6022.8 | 7768.0 | 6618.5 | 0.538 |
| 2 | 0.05 | 180 | 2373 | 3492.6 | 2739 | 4146.6 | 5865.6 | 6885.6 | 7424.8 | 7566.6 | 0.495 |

FIG. 6

| Steady state compositions for the overall permeate for the successful runs ||||||||
|---|---|---|---|---|---|---|---|
| Residence time (h) | NaOH concentration (wt.%) | Steady state values of the permeate (wt.%) ||||||
| | | TG | DG | MG | FAME | Glycerol | Methanol |
| 1 | 1 | 0 | 0.14 | 0 | 59.8 | 4.15 | 35.9 |
| | 0.5 | 0 | 0.19 | 0 | 58.7 | 4.55 | 36.6 |
| | 0.1 | 0 | 0.13 | 0 | 57.0 | 4.83 | 38.0 |
| | 0.05 | 0 | 0.07 | 0 | 56.6 | 5.27 | 38.0 |
| | 0.03 | 0 | 0.0 | 0 | 28.4 | 6.24 | 65.4 |
| 2 | 0.05 | 0 | 0.11 | 0 | 56.7 | 5.41 | 37.8 |
| | 0.03 | 0 | 0 | 0 | 29.5 | 3.41 | 67.1 |
| | 0.01 | 0 | 0 | 0 | 12.6 | 3.0 | 84.4 |
| | 0.0 | 0 | 0 | 0 | 8.4 | 2.9 | 88.6 |

FIG. 9

| RT (h) | NaOH conc. (wt%) | Steady state compositions for the FAME rich phase (wt%) | | | | | | Steady state compositions for the methanol rich phase (wt. %) | | | | | |
|---|---|---|---|---|---|---|---|---|---|---|---|---|---|
| | | TG wt% | DG wt% | MG wt% | FAME (wt%) | Glycerol (wt%) | Methanol wt% | TG wt% | DG wt% | MG wt% | FAME wt% | Glycerol wt% | Methanol wt% |
| 1 | 1 | 0.0 | 0.24 | 0.0 | 86.9 | 0.0 | 12.8 | 0.0 | 0.0 | 0.0 | 11.9 | 11.4 | 76.6 |
| | 0.5 | 0.0 | 0.32 | 0.0 | 86.8 | 0.0 | 12.9 | 0.0 | 0.0 | 0.0 | 11.8 | 12.1 | 76.1 |
| | 0.1 | 0.0 | 0.31 | 0.0 | 84.3 | 0.0 | 15.4 | 0.0 | 0.0 | 0.0 | 10.2 | 13.1 | 76.7 |
| | 0.05 | 0.0 | 0.24 | 0.0 | 85.0 | 0.0 | 14.8 | 0.0 | 0.0 | 0.0 | 13.8 | 13.2 | 73.0 |
| | 0.03 | 0.0 | 0.00 | 0.0 | 84.0 | 0.0 | 16.0 | 0.0 | 0.0 | 0.0 | 9.6 | 8.4 | 82.0 |
| 2 | 0.05 | 0.0 | 0.28 | 0.0 | 85.0 | 0.0 | 14.7 | 0.0 | 0.0 | 0.0 | 14.0 | 13.6 | 72.4 |
| | 0.03 | 0.0 | 0.00 | 0.0 | 84.3 | 0.0 | 15.7 | 0.0 | 0.0 | 0.0 | 12.0 | 6.9 | 81.0 |

FIG. 10

| Time of appearance of the first signs of phase separation of the permeate on cooling to room temperature for all samples |||
|---|---|---|
| RT (h) | NaOH concentration *(wt.% by weight of oil ) | Time of appearance of phase separation (min) |
| 1 | 1 | 0 |
| 1 | 0.5 | 0 |
| 1 | 0.1 | 8 |
| 1 | 0.05 | 15 |
| 2 | 0.05 | 18 |
| 1 | 0.03 | 25 |
| 2 | 0.03 | 30 |

FIG. 13

BIODIESEL PRODUCTION USING ULTRA LOW CATALYST CONCENTRATIONS IN A MEMBRANE REACTOR

CROSS-REFERENCE TO RELATED APPLICATIONS

This application is a Continuation-In-Part Application of International Patent Application PCT/CA2008/002068 filed Nov. 24, 2008, which claims priority to U.S. Provisional Patent Application No. 60/989,883 filed Nov. 23, 2007, both of which are herein incorporated by reference.

FIELD OF THE INVENTION

The present invention relates generally to biodiesel production. More particularly, the present invention relates to biodiesel production in a membrane reactor.

BACKGROUND OF THE INVENTION

Biodiesel is a non-toxic, biodegradable, renewable diesel fuel obtained from lipid feedstocks. The most common production process for biodiesel is through the batch transesterification of vegetable oils with methanol. In batch and some continuous processes, the concentrations at which the catalyst is used to drive the reaction to completion can result in high material and processing costs. Greater attention is being focused on glycerols being a potential cause of biodiesel instability. Reaction conditions can result in the formation of oxidized by-products that cause discoloration. This is especially when glycerols are exposed to either high temperature or alkaline pH. Glycerols can oxidize or thermally degrade to form diols or acids that can contribute to the instability of biodiesel. These degradation by-products may catalyze the polymerization of unsaturated fatty acids causing the formation of gels. In addition to this, high alkalinity is linked to the excessive formation of soaps and the degradation of components found in lipid feedstocks, which impart color to the resulting biodiesel.

Much work on heterogeneous catalysts has been done in the past decade; however most of the work was done at temperatures and pressures well above those used in atmospheric batch processes. Under these conditions, the reaction rates of homogeneously catalyzed reactions would be enhanced. However, equilibrium limitations require substantial amounts of catalyst be present to drive the reactions to completion at or near the normal boiling point of methanol, the most widely used alcohol in the transesterification reaction.

Purification of a fuel or fuel additive formed using a catalyst can be conducted to purify the product to remove or reduce undesirable compounds or degradation products such as diols. While distillation may be used for purification, it has the disadvantage that non-volatile free-radical scavengers, such as tocopherols (vitamin E and its derivatives) normally present in oils would not substantially be carried over in the distillate. Such compounds have the beneficial effect of scavenging free radicals that may promote degradation of the product. The product life of a fuel such as biodiesel may be expected to meet or exceed about 3 months, but without the presence of tocopherols, a product purified through distillation may have a greatly reduced product life (or "shelf life"). It is desirable to maintain such free radical scavengers as tocopherols in a biofuel to maintain as long of a shelf life as possible. The color of a biodiesel product versus that of the initial lipid is an indicator of the formation of degradation products, the darker the product, the higher the level of degradation products contained therein. Further, the higher a product's resistance to degradation through oxidation, the more commercially valued the product.

There is a need for a method of forming a biofuel that reduces the quantity of catalyst needed, while maximizing the presence of tocopherols and minimizing the presence of degradation products.

SUMMARY OF THE INVENTION

It is an object of the present invention to obviate or mitigate at least one disadvantage of previous methods for producing biodiesel.

There is described herein a method of producing a fuel or fuel additive. The method comprises mixing triglyceride (or an oil) and an alcohol as an oil-in-alcohol emulsion. The triglyceride and alcohol are mixed together with a catalyst, thus forming a reaction mixture for converting the triglyceride to said fuel or fuel additive. The method further comprises reacting the triglyceride and alcohol in the presence of the catalyst to produce a fuel or fuel additive. The method additionally comprises continuous removal of the fuel or fuel additive formed from the reaction mixture. In this method, the catalyst is present at a concentration below a conventional concentration range.

Reducing the amount of homogeneous catalysts required for the transesterification reduces the need for washing of the fatty acid methyl ester (FAME) product, reduces degradation by-products formed by exposing the fats and oils to lower alkalinity, reduces the polymerization of biodiesel, reduces precipitate formation, extends the shelf life of biodiesel, reduces the formation of soaps, and improve the colour of the resulting product.

The transesterification of canola oil with methanol was investigated at varying catalyst concentrations and residence or retention times (RT) in a continuous membrane reactor. Prior to all experiments, the free fatty acid in the canola oil was neutralized with sodium hydroxide. Experiments were performed at 0.0, 0.01, 0.03, 0.05, 0.1, 0.5, and 1 wt % catalyst on an oil basis. It was found that a base catalyst concentration above 0.05 wt % for a one-hour retention time (RT) and above 0.03% for a two-hour RT resulted in the steady-state biodiesel production via the membrane reactor. Such catalyst amounts are 10 to 33 times lower than those employed in the industrial production of biodiesel (e.g., 0.5 to 1 wt % sodium hydroxide concentration). All the biodiesel produced in this work did not contain mono and triglycerides, or could be considered as essentially free of mono and triglycerides in any amount higher than a trace or negligible amount.

The results demonstrated that maintaining the phase separation between the triglyceride (or oil) and methanol during the reaction, as an emulsion, and the ability to separate these phases, for example, buy using a membrane, permitted formation of a high quality product. Oleophilic impurities in the lipid feedstock were not integrated into the final biodiesel as in conventional processes due to the presence of two phases in the reactor. The results illustrate the advantages in using a membrane reactor to produce biodiesel, where products are continuously removed from the reactor in a different phase than the lipid reactant.

In a first aspect, the present invention provides a method for producing a fuel or a fuel additive providing a reaction mixture comprising oil and an alcohol in an oil-in-alcohol emulsion and a catalyst for converting the oil to the fuel or the fuel additive. The oil and the alcohol are reacted in the presence of the catalyst, present at a concentration below that used in a conventional batch process, to produce the fuel or fuel additive. The fuel or fuel additive produced is continuously removed during the reaction. Advantageously, low catalyst concentration permits low quantities of soap formation, relative to conventional methodologies. Further, because of the cost of the catalyst, lowering the concentration of catalyst needed to drive the reaction toward the product results in cost savings.

Conventionally, the less catalyst used, the less the reaction would be driven toward full conversion of all reactants. Thus, previously, catalysts have been thought to be needed in high concentration. By continuous removal of the product, chemical kinetics have been manipulated to drive the reaction toward conversion without high quantities of catalyst, drawing off products of the reaction through a selective membrane permits continuous favorable kinetics. Batch-type processes require high levels of catalyst to drive the reaction toward conversion. Advantageously, continuous flow of reactants through a reaction vessel according to the instant method permits formation of a highly pure product, with lower levels of degradation product, and with a lighter color.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

FIG. 1 is an illustration of the stoichiometric reaction for the conversion of triglycerides (TG) to fatty acid methyl ester (FAME), when methanol is used as an alcohol, R' is —$CH_3$.

FIG. 3 shows a table listing experimental conditions used.

FIG. 5 shows a table listing the effect of catalyst concentration on the conversion of oil fed to the reactor and the conversion of oil initially in the reactor.

FIG. 6 shows a listing of methanol and oil fed to the reactor and overall volume fraction of methanol in the reactor during a run for all residence times and catalyst concentrations.

FIG. 9 shows a table illustrating steady state compositions for the overall permeate for the successful runs.

FIG. 10 shows a table illustrating the steady state compositions for the phase separated permeate, FAME rich phase and methanol rich phase for the successful runs.

FIG. 13 shows a table indicating the time of appearance of the first signs of phase separation of the permeate on cooling to room temperature for all samples

DETAILED DESCRIPTION

Figure 2:
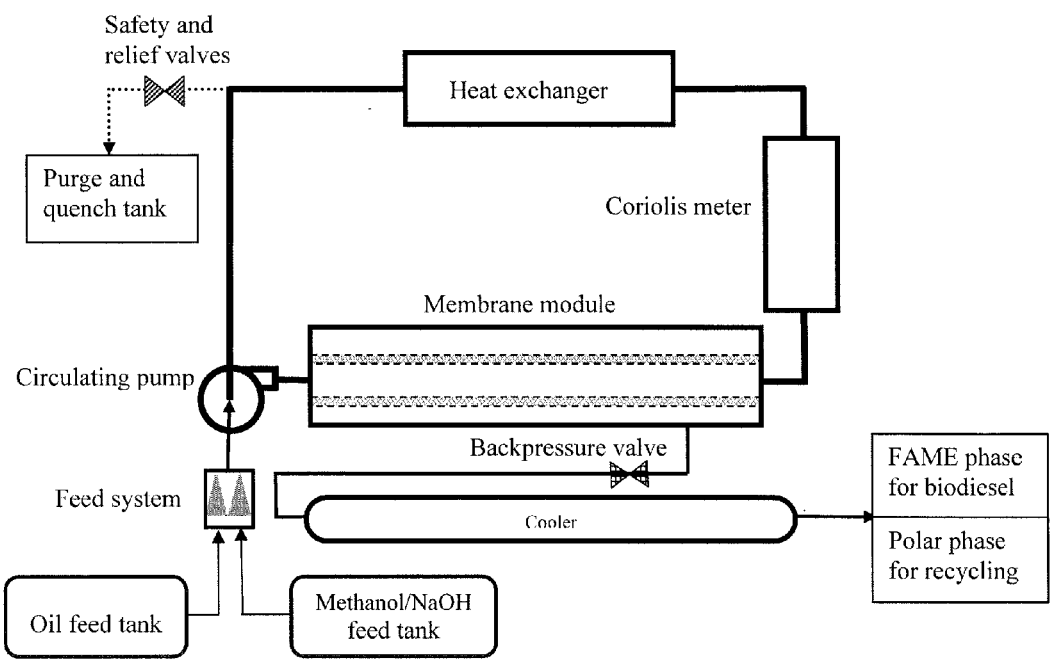
FIG. 2 is a schematic representation of the membrane reactor used for the production of biodiesel.

Generally, the present invention provides a method and system for method for producing a fuel or fuel additive. The method comprises providing a reaction mixture comprising oil and an alcohol in an oil-in-alcohol emulsion and a catalyst for converting the oil to the fuel or the fuel additive. The oil and the alcohol are reacted in the presence of the catalyst, present at a concentration below that used in a conventional batch and some continuous processes, to produce the fuel or fuel additive. The fuel or fuel additive produced is continuously removed during the reaction.

Advantageously, by de-coupling the catalyst concentration with the rate of conversion, a lower amount of catalyst can be used, and the reaction proceeds toward conversion. By constant removal of product, the conversion equilibrium continues to proceed unidirectionally toward formation of product without requiring high quantities of catalyst. Increasing the time spent in a reactor permits a further reduction in the amount of catalyst required in formation of a fuel or fuel additive product.

Described herein is a method of producing a fuel or fuel additive. The method comprises mixing triglyceride with and an alcohol so as to form an oil-in-alcohol emulsion. This emulsion also includes the presence of a catalyst mixed together with the triglyceride and alcohol, thus forming a reaction mixture for converting the triglyceride into a fuel or fuel additive. The triglyceride and alcohol are reacted in the presence of the catalyst to produce the fuel or fuel additive. During the reaction, there is continuous removal of the fuel or fuel additive from the reaction mixture. The catalyst is present in the reaction mixture at concentration below a conventional concentration range.

By the term "conventional concentration range", conventional technologies for transesterification may be considered. Specifically, these technologies employ batch formation of fuel from oils. Higher levels of catalyst have conventionally been required to encourage the reaction toward the fuel product. A typical conventional concentration range is from about 0.5 to about 1.0 wt %. Advantageously, the instant method permits the catalyst to be present at a concentration that is up to about 33 fold lower than a conventional concentration range. An exemplary level of catalyst is about 0.05 wt % during an RT of 1 hour. An additional exemplary level of catalyst is about 0.03 wt % during an RT of 2 hours.

The step of reacting may occur under conditions that allow the reaction to proceed, as can be readily determined by a person of skill in the art. An exemplary temperature of about 65° C. can be used. Higher or lower temperatures may also be used. To permit further reductions in the amount of catalyst used, an increase in reaction temperature can be incorporated. While a typical temperature at which the reaction can proceed is about 65° C., higher temperatures may also be used, permitting lower catalyst concentrations.

The method may comprise regularly repleting feedstock oil or triglyceride, methanol and/or catalyst to the reaction mixture. Regular additions encompass additions ranging from a substantially constant addition to maintain a constant composition in the reaction mixture to a periodic addition in a "semi-batch" type of mode, where up to half of the reaction mixture, for example 50%, 60%, 70%, 80%, 85%, 90% or 95% is consumed and allowed to proceed toward formation of product before adding new feedstock oil or triglyceride, methanol and/or catalyst. It is possible to encompass both semi-batch type additions of one or more of the ingredients, while providing the remaining ingredients in a continuous manner, or all ingredients may be added either in continuous form or on a periodic basis in a semi-batch type of mode. Thus, continuous or periodic addition of ingredients to the reaction mixture are encompassed.

The step of continuously removing from the reaction mixture a fuel or fuel additive may comprise removal of a methanol-containing phase from the reaction mixture, which would include such ingredients as catalyst, methanol and water. These ingredients may be re-used in the process in the interests of recycling and keeping costs low. Further discussion of recycling ingredients removed in the methanol-containing phase is provided below. Purification of ingredients obtained in the recovered methanol-containing phase may be conducted, but the content of the methanol-containing phase may be used without further purification once the fuel produced has been removed from this phase. Removal of methanol and/or catalyst for re-use has the advantage of reducing costs and increasing the efficiency of the process.

The method described herein may involve, in the step of reacting, continuously circulating said reaction mixture in a continuous loop reactor. The step of continuously removing said fuel or fuel additive formed in the step of reacting may comprise flowing the reaction mixture past a cross-flow membrane in a continuous loop reactor. Such a reactor may be one as described in International Publication No. WO 2006/089429 published Aug. 31, 2006, the entirety of which is herein incorporated by reference.

The catalyst can be any one conventionally used, or may differ from conventional catalysts, provided it promotes the formation of a triglyceride to a fuel, in the presence of an alcohol. Such a catalyst may be a strong mineral base. Exemplary catalysts include sodium hydroxide, sodium methoxide, potassium methoxide, potassium carbonate, potassium hydroxide, or a combination of these. In the case where the catalyst is a methoxide, an exemplary level of methoxide is, for example, 0.25 wt % on a triglyceride basis.

It is possible to use a catalyst that is a non-hydroxide based catalyst. The catalyst may be a heterogeneous catalyst that is held within a fixed bed within a reactor loop.

In the step of reacting, transesterification of the triglyceride may be conducted so as to form fatty acid methyl esters (FAME). In the step of continuously removing the fuel or fuel additive, removal of fatty acid methyl esters (FAME) from the reaction mixture may occur. The removal of the fuel or fuel additive from the reaction mixture may be conducted using a selective membrane filter or may be done using phase separation.

The triglyceride used in the instant method may comprise vegetable oil, and the resulting fuel may be considered a 'biofuel''. The alcohol may comprise methanol or ethanol.

A fuel or fuel additive formed according to the method described herein possesses unique characteristics, compared with fuels formed according to conventional transesterification technologies, for example, those done in a multi-stage batch-type processing format. For example, the fuel or fuel additive formed according to the method described is essentially free of triglycerides. Unreacted triglyceride is not removed from the reaction mixture, and thus does not end up in the product. Similarly, the fuel or fuel additive formed as described herein has a low monoglyceride and diglyceride content. Further, there is a high tocopherol content remaining in the product, compared with other products that may be purified using such methodologies as distillation. The fuel or fuel additive may also have a low diol content relative to conventional products formed using other methodologies. The fuel or fuel additive also contains a lower content of oxidation products. These relative quantities of undesirable components are lower than the quantities found in fuels prepared using conventional methodologies in which the reaction mixture is reacted to near completion, and/or ones in which the product is further purified, for example, by using distillation. These conventional or "traditional" transesterification technologies have the disadvantage of a shorter shelf-life, in part due to the presence of undesirable compounds that may encourage oxidation.

Further advantages of the method described herein include the ability to conduct the method in a single non-batch step. Conventional methods for forming fuels from oil may require a plurality of reactors and separators, resulting in numerous steps involving transfer of fluids. The equipment is costly, and conduits required in the transfer of liquids between reactors may be subject to regular clogging. By using a single step process in which one reactor and one separator is employed, there is a lower equipment cost and a correspondingly reduced likelihood of shut-downs due to equipment failure or fluid transfer issues.

The product produced according to the method described herein is advantageously free of undesirable compounds, such as unreacted tri- and mono-glycerides and, very low concentrations of diglycerides. Such compounds, often found in conventional oil-derived fuels may precipitate out at colder temperatures, causing clogging. Further, the shelf-life of the product formed is high, due to high purity, and the maintenance of anti-oxidants (or free-radical scavengers) such as tocopherols. By maintaining such compounds as tocopherols in the fuel product, there is less degradation due to oxidation.

Biodiesel is a clean-burning, renewable, liquid fuel that can be used instead of petroleum diesel in compression-ignition engines. Biodiesel is sometimes used in its pure form, B100, but most often as a 5% (B5) or 20% (B20) blend with petrodiesel. Minor engine modifications may be required in older diesel engines to avoid the dissolution of various seals when B100 biodiesel is utilized, however, B5 or B20 blends can be used in unmodified diesel engines.

FIG. 1 depicts the classical transesterification reaction. Transesterification, also referred to as alcoholysis, is a process that combines triglycerides (TG) with alcohol (e.g., methanol) in the presence of a catalyst (e.g., sodium hydroxide or NaOH) in order to yield fatty acid alkyl esters (FAAE or biodiesel) and glycerol.

Here, R1, R2, and R3 represent hydrocarbon chains. The conversion of triglyceride oils to methyl esters through a transesterification process reduces the viscosity of the oil by a factor of eight and increases the volatility. There are many variables that influence the reaction time of the transesterification as well as the conversion efficiency, but the most important ones include the temperature, the catalyst type and its concentration, the alcohol to ester ratio, and the mixing rate.[1] The purity of the reactants, e.g., the presence of water, free fatty acid (FFA), or other contaminants found in unrefined oils (or other feedstocks), is also very important.[2]

Although it is possible to conduct transesterification without the addition of catalyst, to the reaction mixture, this approach requires high pressures (20 MPa) and temperatures (350° C.).[3] Kusdiana and Saka have developed a catalyst-free method for biodiesel fuel production by employing supercritical methanol.[4] The optimum condition for the transesterification of rapeseed oil to biodiesel fuel was found to be 350° C., at a pressure of 43 with a molar ratio of 42:1 of methanol to oil. The great advantage of this method was that FFAs present in the oil could be simultaneously esterified with supercritical methanol.[5]

Both homogeneous and heterogeneous catalysts have been used for transesterification reactions. Homogeneous catalysts can be either bases or acids.[6] The most common catalysts are strong mineral bases such as NaOH, sodium methoxide and potassium hydroxide (KOH). After the reaction, the base catalyst requires neutralization with a strong mineral acid. The reason that basic catalysts are the most frequently used, is that the process is faster and the reaction conditions are moderate.[7]

Bases such as sodium methoxide or other no-hydroxide catalysts may be advantageously used to reduce the formation of soaps during the reaction, which is often observed when NaOH is used. Advantageously, the lack of hydroxyl groups reduces the tendency toward soap formation. Further, the presence of —OH in a catalyst may additionally form water during the reaction, which may inhibit the reaction from proceeding toward completion, When a base, such as NaOH, KOH or potassium carbonate ($K_2CO_3$) is used as a catalyst, it reacts with the alcohol to form an alkoxide group which is the genuine catalyst for the transesterification.[2] This mechanism is shown below and here, R' is a short alkali group, and R'O$^-$ is the actual catalyst:

$$OH^- + R'OH \Leftrightarrow R'O^- + H_2O$$

Nonetheless, when employing base catalysts, soap can form by two kinds of undesirable side-reactions; either by neutralization of the FFA in the oil or by TG saponification. The formation of soap partially consumes the catalyst, decreases the biodiesel yield and complicates the separation and purification steps.

Using KOH as a catalyst for producing biodiesel has the advantage that the production waste stream may have an economic value as a soil fertilizer, due to its potassium content. Moreover, KOH dissolves in methanol much more easily than NaOH.[8] However, high cost and lower purity are big disadvantages for the use of KOH.[9] Thus, a means of obtaining a direct transesterification with base catalysts would be to use methoxide, potassium ethoxide and sodium ethoxide, which can be produced by the dissolution of metallic sodium in alcohol. Vicente et al. concluded that near 100 wt % biodiesel yields could only be obtained with the direct use of methoxide catalysts.[6] The use of high concentrations of methoxide catalysts also produce undesirable glycols and precipitates.

Acid-catalyzed reactions are employed to convert FFAs to esters, or soaps to esters, as a pre-treatment step for high FFA feedstocks. This requires an additional reactor to pretreat the feedstock followed by neutralization prior to the main base catalyzed reaction. Would acid-catalyzed transesterification be used to completely transform the lipid feed stock more extreme temperature and pressure conditions are required.[10] Sulphuric acid, hydrochloric acid and sulfonic acid are usually preferred as acid catalysts. Bronsted acids have been investigated for the conversion of soy oil to FAME at high temperature in sealed vessels.[11] Only sulphuric acid has been shown to be effective in producing high yields of FAME, but still within the laboratory scale, no large-scale industrial synthesis has as of yet been reported for commercial production.[12]

More recently, research on alcoholysis of oil has focused on the use of heterogeneous catalysts. These heterogeneous catalysts include enzymes, titanium-silicates, anion exchange resins and other solid catalysts. Solid acid catalysts have the advantage of being easily removed by filtration and can be used for large-scale production. For instance, zinc oxide supported on aluminum has been successfully employed as a catalyst.[13] Zeolites and metal catalysts have also been used for the transesterification of soybean oil.[14] Other than with chemical catalysts, biodiesel can also be synthesized from oils and fats through the use of biocatalysts.[15]

In conventional biodiesel production, an important issue is the final conversion of TG. While the immiscibility of lipids in methanol essentially renders the transesterification a heterogeneous system, a membrane reactor technology can be introduced for biodiesel production to overcome this issue.[16] This technology takes advantage of the heterogeneous alcohol/lipid system leaving unreacted TG within the membrane reactor. Pushing the reaction to completion prior to product removal is not necessary with the use of a membrane reactor as high purity product is continually being removed from the reactor.

Generally, a higher concentration of catalyst drives the reaction equilibrium to the product side. It also increases the rate of reaction, thus resulting in higher productivity.[17] The acid catalyst concentration has been found to affect the reaction rate and conversion of canola oil to FAME in a membrane reactor at semi-continuous conditions. An acid concentration of between 0.5 and 2 wt % (based on TG) substantially increased the conversion. Acid concentrations higher than 2 wt % were deemed unnecessary.[16]

Excess alkali catalyst causes the formation of soaps. As suggested by Freedman et al.,[7] the concentration of base catalyst used in industry should not exceed 1 wt % of the oil weight. The higher catalyst concentration required for complete conversion has another drawback, which is the higher salt content in the final biodiesel product, resulting in more extensive water washing or treatment downstream.

For biodiesel production from a membrane reactor, one important question that can arise is what would happen if the base catalyst concentration changed. Would a very low concentration of catalyst affect the final biodiesel purity in the membrane reactor? Concentrations of a base catalyst in the range 0 to 1 wt % were investigated in a membrane reactor under two different residence time (RT) regimes. Thus, the objective was to determine the minimum concentration of base catalyst that would lead to a feasible production of FAME. NaOH and sodium methoxide were used as catalysts in this study.

EXPERIMENTAL

Materials

Sodium hydroxide (ACS Reagent grade (NaOH, EMD Chemicals Inc.; NJ, USA) with a minimum purity of 97 wt % was used in this study. The lipid feedstock consisting of canola oil was a "no-name" brand marketed by Loeb grocery stores, and was purchased at a local food store. Methanol (99.85% purity, Commercial Alcohols Inc.; Brampton, ON, Canada), tetrahydrofuran used in the GPC analysis (THF, 99.98% purity, EMD Chemicals Inc., Gibbstown, N.J., USA), and hydrochloric acid (HCl, 36.5-38%, reagent grade, Fisher Scientific Co., Nepean, ON, Canada) were all used as received. Solvents and analytical reagents were of high performance liquid chromatography (HPLC) grade.

Equipment

FIG. 2 shows a schematic representation of the membrane reactor used in the present study. The seven main sub-systems of this membrane reactor system included: a feeding pump system; a permeate system including a heat exchanger to cool the permeate (permeate cooler) and backpressure valve; a circulation pump; a membrane module; a Coriolis meter; a heat exchange system; safety and relief valve system.

The circulating pump, membrane module, Coriolis meter and heat exchanger made up a circulating loop within which the transesterification reaction occurred at a controlled temperature and pressure. A feed system fed both the oil and methanol/catalyst solution to the reactor during the entire run. For safety considerations, backpressure valves were installed on all entry points to the loop. The Coriolis meter in the system was a Proline Promass 83 model (Endress and Hauser, Greenwood, Ind., US) that provided mass flowrate data corrected for temperature variations and density. A heat exchanger was used to control the temperature in the reactor. A Neslab Instruments, Inc., (Portsmouth, N.H., U.S.A.) heating bath was used to control the temperature within the reactor. In the present study, a filtanium™ ceramic membrane (TAMI, Nyons, France) consisting of a titanium oxide support and an active layer was employed. The molecular weight cut off (MWCO) of the membrane was 300 kD and it had a multi-channel tubular configuration. The overall internal volume of the membrane reactor was 6.0 L An exemplary apparatus for biofuel production is described in co-owned International Patent Application PCT/CA2006/000268 (WO 2006/089429).

Procedures

The feedstock oil and methanol/catalyst solution were pumped in a 1:1 volume ratio into the pressurized loop and circulated with the circulating pump. For the 1-hour RT, the oil and methanol feed rates were 45 and 39.5 g/min, respectively. For the 2-hour RT, the oil and methanol feed rates were 22.4 and 19.8 g/min, respectively. The multi-component mixture flowed on the retentate side of the membrane as an emulsion of lipids dispersed in a methanol-rich phase. The FAME/methanol/glycerol phase permeated through the membrane and was collected for purification and/or recycling. The permeate stream was cooled and brought to atmospheric conditions by the backpressure valve. The role of the permeate cooler was to reduce the temperature, thus preventing the volatilization of methanol on the release to atmospheric conditions. The retentate stream passed through the Coriolis meter, was continuously heated by the heat exchanger, and finally the fluid was looped back to the feed side of the circulation pump.

FIG. 3 provides a table listing the experimental conditions. All the runs were initially performed at a temperature of 65° C. and a pressure of 173 kPa (25 psi). The permeate composition profile was measured and the membrane reactor state was monitored over a time period of 1-3 h.

The amount of base required to neutralize the FFA in the oil was 0.02 wt % NaOH (on an oil basis). This was determined by titration with phenolphthalein. This amount of NaOH was added to all oils above the reported amount of base used in the runs. The methanol/NaOH solution was prepared by totally dissolving the calculated amount of NaOH into pure methanol. For each experiment, 3 L of a methanol/NaOH solution at a concentration according to the data shown in FIG. 3 was initially charged into the reactor through the oil feed pump. Three liters of canola oil were then injected into the reactor. The backpressure valve was shut and the heat exchanger and circulating pump were turned on. When the temperature of the reaction mixture reached 65° C. (after ~60 min), the feed system was activated and both the methanol/catalyst and oil feed rates were set to 3 L/h or 1.5 L/h (i.e., the reactor RT was 1 h and 2 h, respectively). The canola oil and methanol/catalyst solutions were fed continuously into the pressurized loop, and the backpressure valve regulated the membrane reactor pressure to 173 kPa (25 psi). Almost immediately after the feed streams were fed to the reactor, permeate began to flow out of the membrane. The reactor pressure, temperature, and trans-membrane pressure (TMP) were recorded continuously. Permeate samples were taken every 15 min during the first hour and then every 30 min up to 2.5 h or until the TMP reached 173.4 kPa. After each run, the pumps and heat exchanger were stopped and the system completely drained. Following each run, the membrane was backwashed and the system was flushed for 30 min with pure methanol and then drained.

Characterization

The analysis of the permeate samples included several steps. Immediately after taking a sample it was neutralized to pH=7 by the addition of 12N hydrochloric acid in methanol. The sample was then passed through a 0.2 µm polytetrafluoroethylene (PTFE) syringe filter and analyzed by gel-permeation chromatography (GPC) to evaluate the influence of a number of variables affecting the transesterification according to the methods reported by Dubé et al.[18] Smaller portions of the samples (0.04 g) were weighed into gas permeation chromatography (GPC) vials and diluted with THF to obtain 20 mg/mL sample solutions for GPC analysis. The GPC system (Waters Corp.) consisted of a pump, a flow and temperature controller, a differential refractive index detector, and two 300×7.5 mm Phenogel columns of 3 µm and 100 Å pore size (Phenomenex) connected in series. The system was operated by Waters Millennium 32 software. HPLC-grade THF was used as the mobile phase at a flow rate of 0.05 mL/min at 25° C. The sample injection loop was 200 µL and the injected sample volume was 20 µL. The running time required for product characterization was approximately 60 min. Calibration curves were generated for the following standards (Sigma-Aldrich): triolein (TG), diolein (DG), monoolein (MG), methyl oleate (FAME), and glycerol. The areas under the peaks in the chromatograms for the product samples were used, together with the calibration curves, to determine the mass of the constituents (TG, DG, MG, FAME and glycerol) present in the permeate samples.

Results and Discussion

As previously mentioned, canola oil and the methanol/catalyst solution were continuously fed to the membrane reactor at a 1:1 volumetric ratio to have at least a 50 volume % of methanol in the reactor. This feed ratio was selected in order to maintain a continuous methanol-rich phase within the reactor. Lower methanol:oil ratios are possible and the continuous phase has been verified up to an initial volume fraction of 0.38 methanol to oil in the reactor.[19] The presence of this continuous methanol-rich phase permits the removal of products (e.g., FAME and glycerol) from the reactor through the pores of the membrane. Should the reaction not occur, oil will be retained in the reactor as it is not soluble in methanol. Eventually oil will form the continuous phase within the reactor and the TMP will increase.

In observations relating to degradation products, color (absorbance) is determined to be an effective indicator of the concentration of degradation products, irrespective of the type of base or acid catalyst used. The higher the concentration of base, in general, the more degradation products are formed. This is why a great advantage resides in using reduced quantities of catalyst. When using low concentrations of catalyst, the use of color as an indicator of degradation products in the reaction product analysis is highly effective. In this example, the separation of the products from the reactants using two phases is highly effective. This principle effectively decouples the conversion in the reactor. Products of the reaction no longer linger within the general vicinity of the unreacted components, and thus do not influence the equilibrium of the reaction. Thus, smaller amounts of catalyst are required to influence the equilibrium of the reaction within the reactor. The color (absorbance) of the FAME and glycerol indicate formation of degradation products, and clearly illustrate that a greater quantity of degradation products is formed with increased catalyst concentration. The separation of products from reactants using two phases is important to maintaining a constant production of product at a low level of catalyst.

Figure 4A:
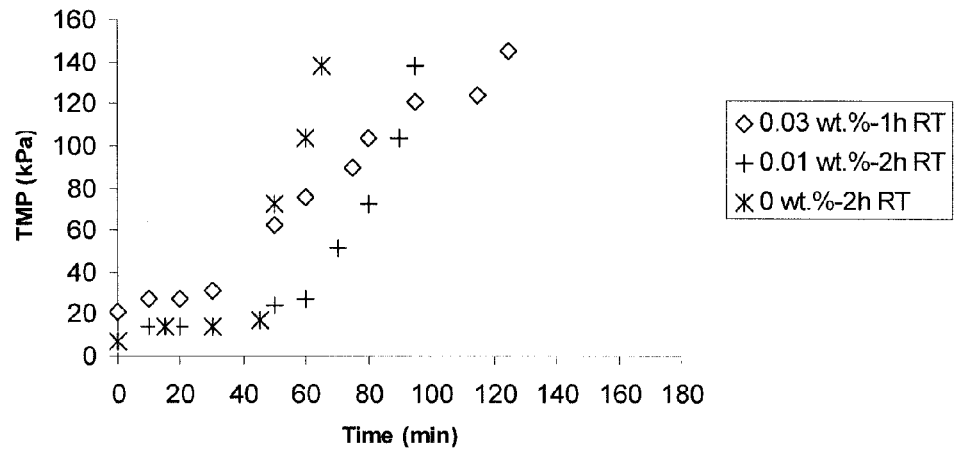
FIG. 4A and FIG. 4B show the trans-membrane pressure (TMP) as a function of time for the reaction conditions that did not permit the continuous operation of the reactor and for those that did, respectively.

A run was performed without catalyst to establish the basis for a non-reacting case. The TMP for this run, performed at 0 wt % catalyst (wt catalyst/wt oil), is shown in FIG. 4A. It can be seen that the pressure drop across the membrane is relatively constant until 45 min, at which point it increases sharply. Based on the amount of oil fed to the reactor in the 45 min, the volume fraction of methanol in the membrane reactor was calculated to be 0.331. Cao et al.[19] have shown that oil is the continuous phase in the membrane reactor at methanol volume fractions lower than 0.31. The sharp increase in the TMP in FIG. 4A is in excellent agreement with Cao et al.[19]. The methanol volume fraction decreased steadily until the 60 min mark at which point it had reached the value of 0.275 and the TMP was 140 kPa. The run was stopped at this point. A sharp increase in the TMP was taken as an indication that oil had become the continuous phase within the membrane reactor. This observation was used to establish if, at a given catalyst concentration and RT, a sufficient amount of oil had been transformed into FAME to allow for the continuous operation of the membrane reactor.

For all runs, TG was not detected in the permeate stream, indicating that the membrane was highly efficient at retaining oil droplets within the membrane reactor. The GPC analyses revealed that transesterification occurred in the reactor. The GPC results also indicated that any dissolved oil present in the methanol phase within the membrane reactor had reacted at the catalyst concentrations used in this work.

The TMP across the membrane was monitored for all runs. These results are shown in FIG. 4A, for the reaction conditions that did not permit the continuous operation of the reactor and in FIG. 4B for those conditions that did. It can easily be seen in FIG. 4A that at catalyst concentrations of 0.03 wt % at a RT of one hour and 0.01 wt % at a RT of two hours, an insufficient amount of oil is reacted at 65° C. to permit the continuous operation of the reactor. This sets a lower bound with respect to the catalyst concentration, under these experimental conditions, for the continuous operation of the membrane reactor. Other runs performed above 0.05 wt % at a RT of one hour and 0.03 wt % at a RT of two hours were easily performed continuously within the membrane reactor as evidenced by the very stable TMP for all operating times shown in FIG. 4B.

Figure 4B:
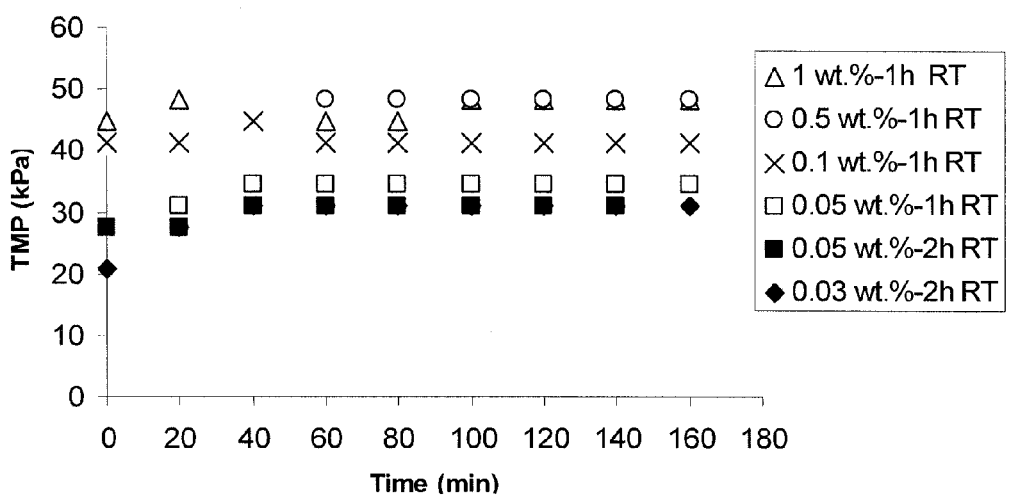
Figure 4C:
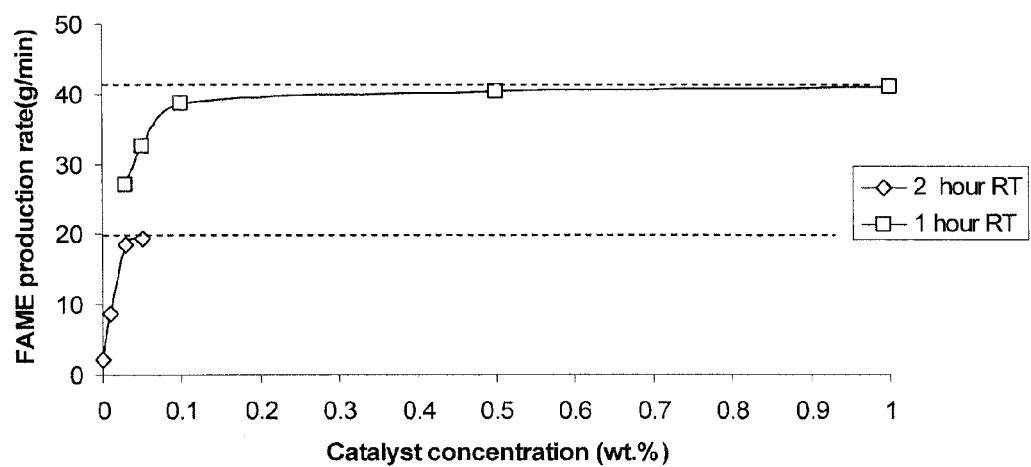
FIG. 4C illustrates FAME production rates for various catalyst concentrations and RTs.

FIG. 4C presents average FAME production rates calculated on the basis of the data found in FIG. 4A and FIG. 4B. The corresponding values for various catalyst concentrations and RTs are presented in FIG. 4C. For a RT of 1 h, the oil feeding rate is about 40.81 g/min. On the assumption that the transesterification was completed in 1 h, the FAME production rate would be 41 g/min. Correspondingly, the FAME production rate for a RT of 2 h would be about 20 g/min for an oil feeding rate of 19.9 g/min. These values are presented in FIG. 4C as dashed lines. As can be seen, for a 1 h RT, only catalyst concentrations higher than 0.1 wt. % led to FAME production rates high enough to render the oil reaction rate approximately equivalent to the oil feeding rate. At the 2 hour RT, oil catalyst concentrations higher than 0.03 wt. % led to FAME production rates high enough to render the oil reaction rate more or less equivalent to the oil feeding rate. Under such conditions, the oil is prevented from accumulating in the reactor, and continuous steady state biodiesel production is realized.

FIG. 5 illustrates the amount of oil remaining in the reactor after each run was determined and tabulated. It can be seen that the concentrations above 0.05 wt % at a RT of one hour and 0.03 wt % at a RT of two hours FIG. 4B allow for the continuous reaction of the oil fed to the reactor and the continuous removal of FAME product via the permeate stream. At these successful conditions, all of the oil fed to the reactor was converted into FAME. At the higher catalyst concentrations, almost all of the oil initially in the reactor had been transformed into FAME. The results indicate that the RT in the reactor could be reduced for all successful steady state runs as no oil accumulated in the reactor under these conditions. The effect of temperature on the kinetics of the base catalysed transesterification reaction is well known[20]. Higher operating temperatures will lead to lower limiting catalyst concentrations.

FIG. 6 shows results that indicate that the amount of methanol in the reactor was approximately 50% for all runs. When FAME is produced in the membrane reactor, it enters the continuous methanol-rich phase circulating in the reactor. Under the reaction conditions, FAME, methanol and glycerol are mutually soluble in this phase. As previously mentioned, the membrane retains the oil droplets (non-continuous phase) in the reactor and allows for the permeation of the methanol-rich continuous phase. As both oil and methanol are continuously fed to the reactor loop, the continuous phase is forced to leave the reactor as permeate via the membrane pores.

Figure 7A:
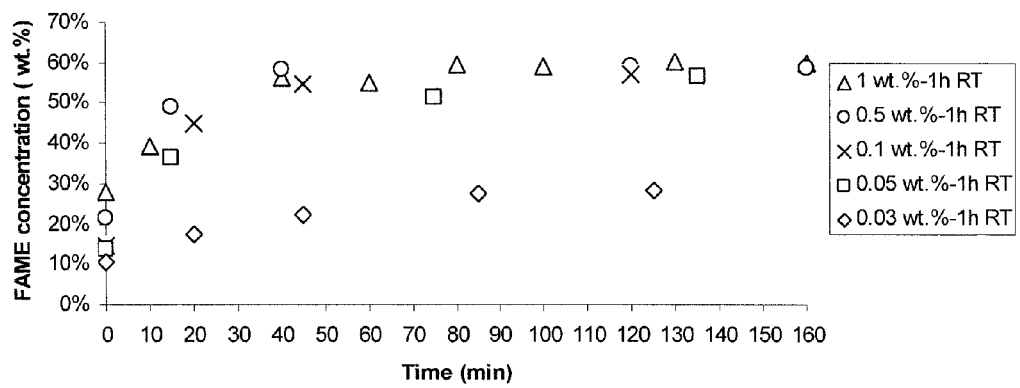
FIG. 7A illustrates the FAME concentration for the runs performed at a one-hour RT and FIG. 7B those performed at a two-hour RT.
Figure 7B:
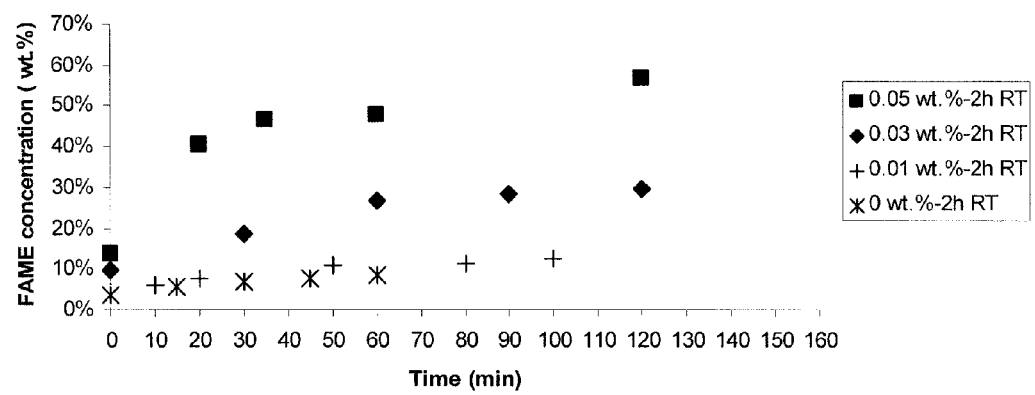

The concentration of FAME in the permeate stream plotted versus time is shown in FIG. 7 for all runs performed in this work. FIG. 7A illustrates the FAME concentration for the runs performed at a one hour RT and FIG. 7B those performed at a two hour RT. It can be seen in FIG. 7A that all runs performed at a one hour RT steadily produced above 50 wt % FAME in the permeate except for the catalyst concentration of 0.03 wt % which did not provide sufficient reactivity for the continuous operation of the membrane reactor as discussed above. In FIG. 7B it can also be seen that the 0.01 wt % (two hour RT) run also produced low concentrations of FAME in the permeate due to insufficient reaction as discussed in the TMP considerations above.

The concentration of catalyst used industrially in a two to three stage reaction process is approximately 0.5 wt % sodium hydroxide. The lower concentration of 0.05 wt % at a RT of one hour is one order of magnitude lower than this value. If a 2-hour RT is used, then the concentration of 0.03 wt % can be used. This is 10 to 33 times lower than the lower concentrations used in industry, which ranges from 0.5 to 1 wt %.[6,7,21-24] At these values the color and quality of the glycerol is substantially improved. In addition to this, depending on the feedstock, the colour of the biodiesel will greatly improve at the lower catalyst concentrations.

All permeate samples with a FAME concentration higher than 20 wt % phase separated on cooling at room temperature. This implied that this concentration was the lower boundary for the phase separation of the permeate at a methanol to oil volume ratio of 1:1.

Figure 8A:
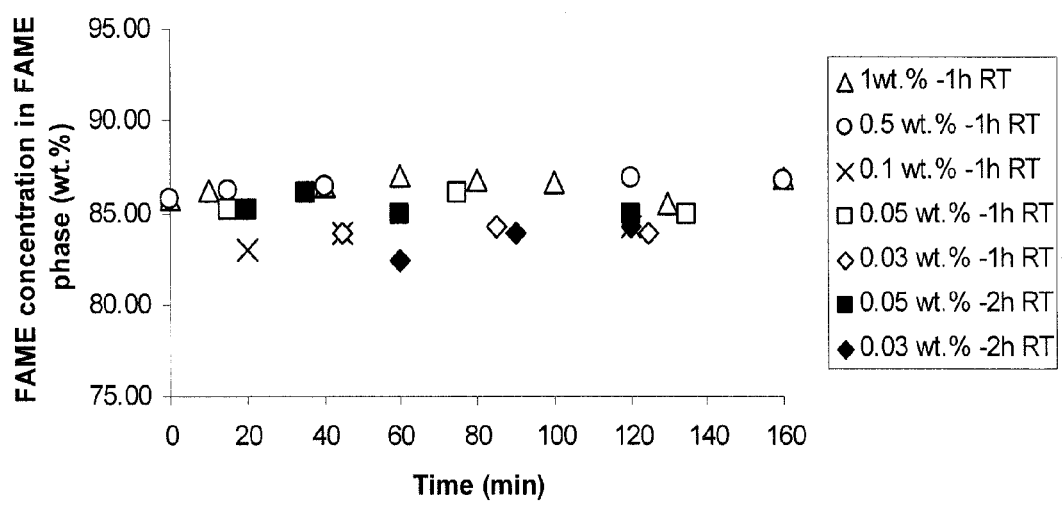
FIG. 8A shows absorbance of a methanol rich phase of phase separated permeate at different catalyst concentrations.
Figure 8B:
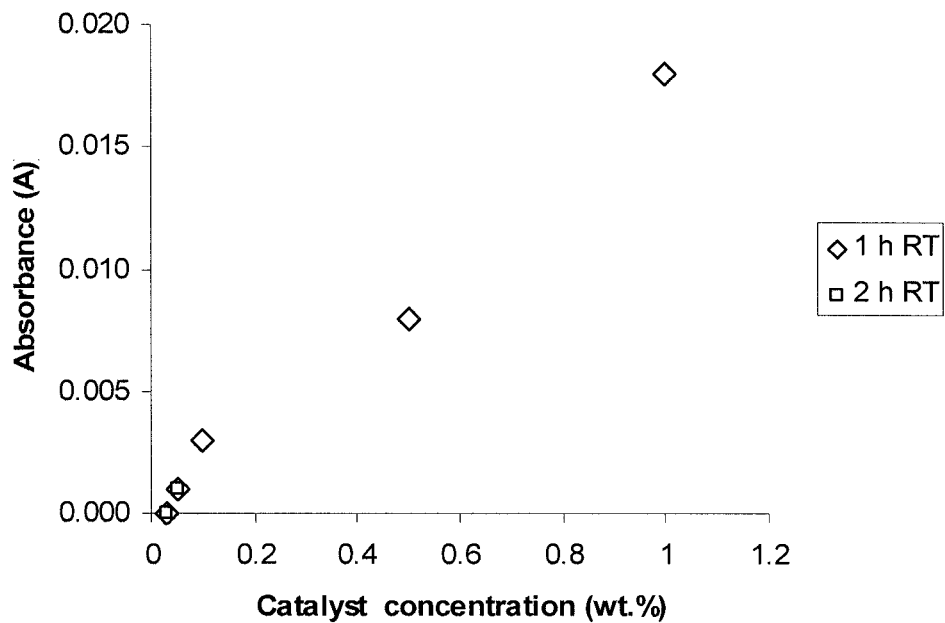
FIG. 8B shows absorbance of a FAME rich phase of the phase separated permeate at different catalyst concentrations.

FIG. 8A and FIG. 8B show the absorbance of a methanol rich phase and a FAME rich phase, respectively of phase separated permeate at different catalyst concentrations, for retention times of 1 hour and 2 hours, respectively. These data show the absorbance of methanol-rich phase and FAME-rich phase of the permeate from different catalyst concentrations using a spectrometer at 600 nm wavelength. This wavelength corresponded to the maximum absorbance for both phases. It can be seen that the absorbance of the glycerol phase increases almost linearly with catalyst concentration, and the color of FAME-rich phase is improved below 0.1 wt % catalyst concentration. Also, the intensity of the colour of the glycerol phase was less than that of the biodiesel which is usually the opposite indicating that few oxidation products were formed. Oxidation products are mostly hydrophilic and partition in the glycerol phase.

It has been demonstrated that a method wherein products are removed, for example through membrane separation, can drive the reversible transesterification towards the product FAME, even at very low catalyst concentrations. All NaOH concentrations above 0.05 wt % produced permeate streams with very similar FAME concentrations. No TG or MG was detected in the permeate stream. Even at these low catalyst concentrations, unreacted TG was unable to pass through the membrane and enter the permeate stream to contaminate the biodiesel product. The unique advantage of the method of product removal is not having to push the reaction to completion before obtaining product. The concentrations of catalyst used in the reaction can be reduced 10 to 33 fold compared to those used industrially. From the perspective of a steady state biodiesel production, the lowest catalyst concentration under the operating conditions used in this work was 0.05 wt % at an RT of one hour and 0.03 wt % at an RT of two hours.

Figure 8C:
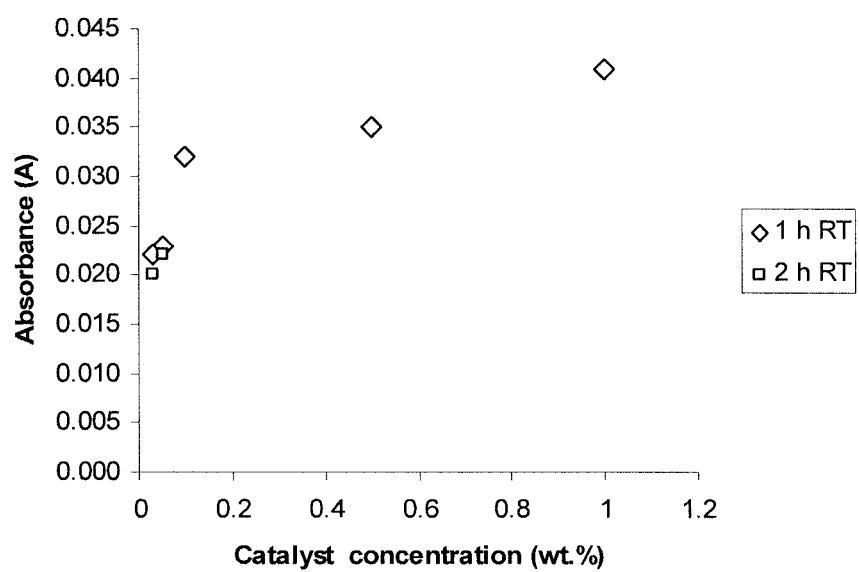
FIG. 8C illustrates the FAME concentration in the FAME-rich phase of the permeate as a function of time.

FIG. 8C illustrates the concentration of the FAME-rich phase of the room temperature separated permeate for the successful steady state runs. The concentration of FAME in this phase is independent of the catalyst concentration used. This indicates that the remaining methanol and glycerol in the FAME-rich phase will contain on average 10 to 33 times less catalyst than found in the present industrial use. This implies less washing to meet ASTM standards, less sorbents required if magnesol or amberlite resins, for example, are used to purify the FAME. The colour of the methanol-rich phase was much lighter when a catalyst concentration of 0.05 wt % was used vs. that produced using a 0.5 wt % catalyst concentration. This phase will eventually be recycled and form what is known as a glycerol co-product. The quality of the resulting glycerol is substantially improved at lower base concentrations resulting in a more valuable co-product that needs little purification before it can be sold.

FIG. 9 lists the overall composition of the permeate at steady state (the last sample taken in the run) in tabular form. The change in catalyst concentration did not have a significant impact on the composition of FAME in the permeate at steady state. This ranged from 56.6 to 59.8 wt % FAME for all runs except the 0.03 wt % two hour RT run. The concentration of FAME in the permeate from this run was almost the same as that of the successful steady state 0.03 wt % two hour RT run (see FIG. 6). This points to the existence of a lower limiting concentration of NaOH catalyst of 0.03 wt % at the 65° C. reaction temperature.

FIG. 10 lists, in table form, the concentrations of the two phases formed when the permeate was allowed to cool to room temperature. The last sample taken in each run is reported in FIG. 9. It can be seen that a high quality FAME phase is obtained by phase separation. No TG or MG were found in this phase, which implies that the FAME obtained from this process will be free of TG and MG and contain very low levels of DG.

FIG. 10 shows DG concentrations that are the actual concentrations of diglyceride (wt %), a larger molecule than glycerol. These values are not the same as the ASTM concentrations for bound glycerol, which quantities must be determined by GC in the ASTM method. However, the numbers provided in FIG. 10 could be multiplied by a factor 0.1488 to give a measurement theoretically equivalent to (or comparable with) bound glycerol.

Undertaking this calculation for the DG values provided in FIG. 10, the following numbers arise. For RT of 1 hour, the DG (wt. %) values and their corresponding theoretical bound glycerol value are: DG of 0.24 (NaOH of 1.00) corresponds to a bound glycerol value of 0.04; DG of 0.32 (NaOH of 0.50) corresponds to a bound glycerol value of 0.05; DG of 0.31 (NaOH of 0.10) corresponds to a bound glycerol value of 0.05; and DG of 0.24 (NaOH of 0.05) corresponds to a bound glycerol value of 0.04. For RT of 2 hours, the DG (wt. %) of 0.28 corresponds to a theoretical bound glycerol value of 0.04.

Notably, this theoretical calculation results in values for bound glycerol that are well below ASTM standards. It would thus be expected that, should ASTM methods be used, results such as these would be obtained.

Figure 11:
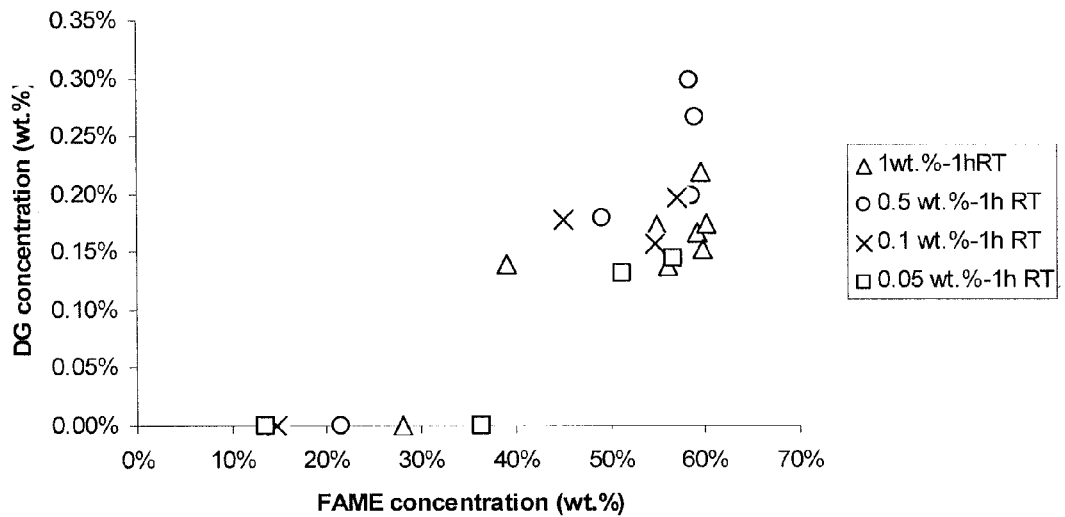
FIG. 11 shows concentration of DG in the permeate stream versus concentration of FAME for different catalyst concentrations at a 1 h residence time.

FIG. 11 shows the concentration of DG vs. that of FAME in the non phase separated permeate stream for different catalyst concentrations at a 1 h residence time. Catalyst concentrations are indicated in the legend.

Figure 12:
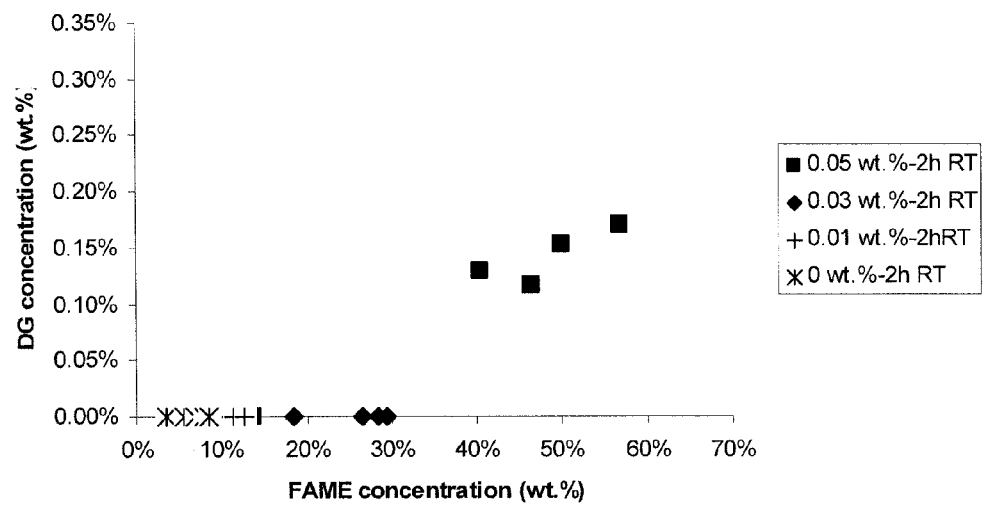
FIG. 12 shows concentration of DG in the permeate stream versus concentration of FAME for different catalyst concentrations at a 2 h residence time.

FIG. 12 shows the concentration of DG vs. that of FAME in the non phase separated permeate stream for different catalyst concentrations at a 2 h residence time. Catalyst concentrations are indicated in the legend.

The concentration of DG in the non-phase separated permeate samples were plotted with respect to FAME concentration in the permeate in FIG. 11 and FIG. 12 for the one hour and two hour RTs, respectively. It can be seen that a relation exists between the concentration of FAME and DG in the permeate. At concentrations below 35 wt % FAME there is no DG in the permeate whereas at concentrations above 35 wt %, trace amounts of DG appear. At the higher FAME concentration, the trace DG can easily be removed from the FAME by further reacting the FAME phase of the permeate with fresh methanol and catalyst in a batch reactor to produce higher quality biodiesel. Alternatively the reactor can be operated at low FAME concentrations in the permeate to produce high quality FAME which does not need further reaction in a single step.

FIG. 13 lists, in tabular form, the time of appearance of the first signs of phase separation for all studied samples. From this data it can be concluded that higher catalyst concentrations increased the speed of the transesterification reaction, as also seen in the conversions found in FIG. 5, leading to greater production of FAME and glycerol and the possibility of operating at shorter residence times.

For the present study, the methanol to oil feed molar ratio was always kept at 24:1. Recycling of the polar methanol-rich phase can be used to decrease the overall methanol to oil molar ratio, and to recycle catalyst in the biodiesel production process via a membrane reactor as described in our previous work.[25]

Conclusions

Biodiesel is becoming a key component in the motor diesel pool, because of its attractive features. Increasing biodiesel consumption requires optimized production processes that are compatible with high production capacities and that feature simplified operations, high yields, as well as the absence of chemical requirements of the catalyst and the minimization of waste streams.

It has been demonstrated that a membrane reactor can drive the reversible transesterification towards the product FAME, even at very low catalyst concentrations. A NaOH concentration above 0.05 wt % produced a permeate with very similar FAME concentrations. No TG or MG was detected in the permeate stream. Unreacted TG was unable to pass through the membrane and enter the permeate stream to contaminate the biodiesel product. The unique advantage of the membrane reactor of not having to push the reaction to completion before obtaining product, has been fully demonstrated in this work. Furthermore, the concentrations of catalyst used in the reaction have been reduced 10 to 33 fold compared to those used industrially. From the perspective of a long-term, steady biodiesel production, the lowest catalyst concentration for obtaining feasible operation conditions was 0.05 wt % at an RT of one hour and 0.03 wt % at an RT of two hours.

Biodiesel production at lower catalyst concentrations will decrease the economic cost of production due to the lower consumption of catalyst, reduce the downstream processing needed to obtain ASTM biodiesel and greatly improve the quality of the biodiesel by eliminating non saponifiable, oleophilic, substances from entering the biodiesel as is currently occurring in batch processing. Because less water wash steps will be needed to remove residual catalyst in the FAME phase, a higher quality glycerol by-product is obtained, which would render the biodiesel process more in line with the environmentally driven ideals behind the use and production of biodiesel. The RT in the membrane reactor was found not to have any effect on the permeate stream profile, and the FAME-rich phase had a very similar composition for catalyst concentrations above 0.03 wt %. This resulted in phase separation of the permeate stream, and thus a consistent purification process at varying catalyst concentrations and a continuous high purity biodiesel production could be realized.

The glycerin produced at lower catalyst in the membrane reactor is of high quality as evidenced by the lower absorbance of the glycerin-rich phase at 600 nm. This is due to a lower degree of degradation of the oil feedstocks and intermediates. The color of the glycerin product is lighter than is produced using conventional technologies, which is a direct result of providing a product having fewer degradation products.

The following data illustrates the oxidation stability of biodiesel produced using different concentrations of base catalyst.

In order to demonstrate the effect of catalyst concentration on the oxidative stability index of biodiesel a number of base catalysed transesterification runs were performed using canola oil. Canola oil was first reacted in a batch reactor with methanol using sodium methoxide as a base catalyst. Once the reaction was complete, the phases were separated and the FAME phase washed with water to produce biodiesel. The resulting FAME was then tested to determine its oxidative stability index (OSI). The results indicate a direct correlation between the concentration of base used in the reaction and the oxidative stability of the biodiesel produced.

Procedure

Materials. The materials used were used for the transesterification reaction: refined bleached and deodorized canola oil (No-Name, Toronto, ON, Canada), methanol (99.85% purity, Commercial Alcohols Inc.; Brampton, ON, Canada), sodium methoxide 25 wt % solution in methanol (Sigma-Aldrich). Organic soya oil was used for the runs using soya oil (Soleil D'Or, La Maison Orphée Inc., Quebec, Qc, Canada). Hydrochloric acid (HCl, 36.5-38%, reagent grade, Fisher Scientific Co., Nepean, ON, Canada) was used to neutralize the FAME after phase separation and deionised water used to wash the FAME phase.

Equipment

Biodiesel Preparation. The canola oil was transesterified in a 3-neck 250 mL flask. The reaction mixture was agitated using a magnetic stirrer. The reactor was placed in a water bath on a temperature controlled heating plate (Torrey Pines Scientific, HS30, San Marcus, Calif.). The temperature of the water bath was regulated using a thermocouple placed directly in the reaction flask. A reflux condenser cooled using tap water was connected vertically above the flask.

Once the biodiesel was produced it was neutralized and phase separated in a separatory funnel at room temperature for one day. The FAME phase was then twice washed with distilled water in a separatory funnel using a 1:3 water to FAME ratio.

Rancimat Setup. The oxidation stability of biodiesel is measured by the Rancimat induction period method, described in the European method EN 14112. In this test, a sample of biodiesel is left to degrade at a temperature of 110° C. while air at a given flowrate is bubbled through it. The airflow passes through a volume of distilled water whose conductivity is monitored. After a period of time, oxidation compounds such as volatile polar products develop in the biodiesel and are carried by the airstream into the distilled water. The time necessary to obtain a deflection in the conductivity vs time response of the conductivity meter by the generation of volatile acids is named the induction period. The induction period in hours is then reported as the oxidation stability index (OSI). The American Society for Testing and Materials (ASTM) also has specifications for biodiesel. The ASTM D6751 standard requires the European method EN 14112.

The Rancimat equipment was made from a block heater (Thermo Scientific, Multiblock Heater), and conductivity meter (YSI 3200) using a YSI 3253 conductivity probe (K=1.0/cm). A test tube 23 mm in diameter, containing 3 grams of biodiesel, was placed in one of the cells of the block heater which kept the tube at 110° C. Air was bubbled in the test tube via a Pasteur pipette which was connected to a filtered air supply using a tygon tubing (¼ inch). An exit tube (¼ in.) captured all of the oxidation gases and carried them into a glass trap depositing all the biodiesel droplets that may have been carried throughout the tube. The glass trap was connected to another exit tubing (¼ in.) which led to a three neck flask where the conductivity probe was submerged in distilled water. The conductivity meter was connected to a computer via an RS 232 port. The conductivity was recorded every minute using LabView™ software.

Methods

Biodiesel Preparation

The biodiesel was prepared at varying base catalyst concentrations ranging from 0.2% to 2.0%. For exact amounts of each reagent for varying base catalyst concentrations, are listed in Table 1 below.

TABLE 1

Preparation of Biodiesel Samples for experiments using canola

| | Sample # | | | | | | | |
|---|---|---|---|---|---|---|---|---|
| | 1 | 2 | 3 | 4 | 5 | 6 | 7 | 8 |
| Weight of canola oil (g) | 150 | 150 | 150 | 150 | 150 | 150 | 150 | 150 |
| Base wt % | 1.5 | 2 | 1 | 0.5 | 0.2 | 1.75 | 1.25 | 0.75 |
| Weight of methoxy solution (25 wt % solution) | 9.0 | 12.0 | 6.0 | 3.0 | 1.2 | 10.5 | 7.5 | 4.5 |
| Weight of Base (g) | 2.25 | 3 | 1.5 | 0.75 | 0.3 | 2.625 | 1.875 | 1.125 |
| Weight of Methanol (g) | 26.537 | 24.287 | 28.787 | 31.037 | 32.287 | 25.412 | 27.662 | 29.912 |

Each solution was prepared by adding methanol, canola oil, and the base catalyst sodium methoxide 25 wt % in solution in methanol to the 250 mL flask placed in the temperature controlled water bath. The mixture was then heated to 65° C. while continuously stirring at 730 revolutions per minute. The mixture was reacted for 1 hour after the temperature of 65° C. had been reached. The mixture was then removed from the water bath and allowed to cool. The mixture was then neutralized using a solution of hydrochloric acid and methanol; the neutralization was verified using litmus paper. After neutralization the sample was left untouched for a day in order for the phases to settle. The glycerol phase was then removed and the FAME phase collected.

Methanol remaining in the FAME phase was evaporated at 85° C. for an hour while continuously stirring at 300 rpm to remove the excess methanol. The sample was then cooled and then washed using distilled water with a 1:3 ratio for 24 hours. The washing procedure was repeated again and then the biodiesel was ready for testing by the Rancimat method.

Rancimat Method. Three 3.0 grams of biodiesel were put in a test tube and placed in the Rancimat experimental set up. The volumetric flowrate of air was 10 L/h and the block heater was maintained at a constant temperature of 110° C. A volume of 85 mL of deionised water was used in the flask housing the conductivity cell. LabView™ continuously measured the conductivity at one minute intervals for a period of 15 hours.

Results and Discussions

Before the biodiesel samples of 0.2%, 0.5%, 0.75% 1.0%, 1.25%, 1.5%, 1.75% and 2.0% were evaluated via Rancimat method a blank standard was tested containing only canola oil in order to obtain a basis of OSI. The point of inflection in the conductivity vs time curve was evaluated graphically and reported as the OSI in hours. The OSI value for the blank (0% base concentration) was determined to be 12.5 hours. This value is expected to be high since it is comprised of solely triglycerides and was not exposed to base catalyst.

The results for all runs and two repeat runs at 0.5 and 1 wt % base catalyst are reported in Table 2 below.

TABLE 2

OSI results for canola oil

| | OSI Value (h) | |
|---|---|---|
| Catalyst concentration wt % | Trial 1 | Trial 2 |
| 0 | 12.5 | |
| 0.2 | 8.75 | |
| 0.5 | 6.85 | 6.78 |
| 0.75 | 6.13 | |
| 1 | 5.46 | 5.39 |
| 1.25 | 4.87 | |
| 1.5 | 3.72 | |
| 1.75 | 3.2 | |
| 2 | 2.4 | |

Biodiesel samples that fall below the criteria of 6 hours (EN 14214) would need the addition of antioxidants in order to raise the OSI value.

A plot of the OSI vs catalyst concentration excluding the 0 and 0.2 wt % catalyst concentrations gave a very straight line with the relation:

$$OSI(h) = -2.9929 \text{ catalyst concentration(wt \% sodium methoxide)} + 8.4025$$

The square of the regression factor for this equation was $R^2 = 0.9944$.

The value of the OSI at 0.2 wt % base was above this line indicating that the transesterification was not complete and that residual unreacted oil was present in the biodiesel at this concentration. Such a low base concentrations cannot be used in the batch procedure used in this section in order to produce triglyceride free biodiesel. This is a limitation of existing processes that has been circumvented by the present invention.

These experiments were repeated for the tansesterification of soya oil using the exact method described above. The results for soya oil are listed in Table 3 below.

TABLE 3

OSI results for soya oil

| Catalyst concentration (wt %) | OSI value (hr) |
|---|---|
| 0.0 | 5.24 |
| 0.2 | 4.65 |
| 0.5 | 3.90 |
| 1.0 | 3.56 |
| 1.5 | 3.12 |
| 2.0 | 2.66 |

A plot of the OSI vs catalyst concentration excluding the 0 and 0.2 wt % catalyst concentrations gave a very straight line with the relation:

$$OSI(h) = -0.816 \text{ catalyst concentration(wt \% sodium methoxide)} + 4.342$$

The square of the regression factor for this equation was $R^2=0.988$.

The negative slope for both oils relation indicates that the OSI decreases with an increase in the catalyst concentration used in the transesterification reaction.

The OSI was found to be directly proportional to the amount of catalyst used in the transesterification process. All the canola samples below base concentration of 0.75% meet the EN 14214 requirements of OSI value of 6 hours. The samples prepared using soya oil are all very close to the ASTM D6751 limit of 3 hours and improve below 0.5 wt % base catalyst concentration.

All documents referred to herein are incorporated by reference.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

REFERENCES (1) Ma, F.; Clements, L. D.; Hanna, M. A. Biodiesel Production: A Review. Bioresour. Technol., 1999, 70, 1-15.
(2) Ma F., Clements L. D., and Hanna M. A., The effects of catalyst free fatty acids and water on transesterification of beef tallow, Trans. ASAE, 1998, 41, 1261-1264.
(3) Dasari, M. A., Goff M. J., and Suppes G. J., Noncatalystic alcoholysis of soybean oil, J. Am. Oil Chem. Soc., 2003, 80, 189-192.
(4) Kusdiana D and Saka, S., Kinetics of transesterification in rapeseed oil to biodiesel fuel as treated in supercritical methanol, Fuel, 2001a, 80, 693-698.
(5) Kusdiana, D., Saka, S., Methyl esterification of free fatty acids of rapeseed oil as treated in supercritical methanol. J. Chem. Eng. Jpn., 2001b, 34, 383-387.
(6) Vicente G, Martinez M, Aracil J., Integrated biodiesel production: a comparison of different homogeneous catalysts systems, Bioresour. Technol., 2004, 92, 297-305.
(7) Freedman, B., Pryde, E. H. and Mounts, T. L., Variable affecting the yield of fatty ester from transesterified vegetable oils. Journal of American Oil Chemical Society, 1984, 61, 1638-1643.
(8) Charles Peterson, Gregory Möller, Randall Haws, Xiulin Zhang, Joseph Thompson and Daryl Reece, Ethyl Ester Process Scale-up and Biodegradability of Biodiesel Final Report, 1996, November, No. 303.
(9) Markolwitz, M., Consider Europe's most popular catalyst, Biodiesel Mag., 2004, 1, 20-22,
(10) Schwab, A. W., Bagby, M. O. and Freedman, B., Preparation and properties of diesel fuels from vegetables oils. Fuel, 1987, 66, 1372-1378.
(11) Canakci, M. and Van Gerpen J., Biodiesel production via acid catalysis. Transactions of ASAE, 1999, 42, 1203-1210.
(12) Knothe G.; Krahl J.; Van Gerpen J. The Biodiesel Handbook; AOCS Press: Champaign, Ill., 2005; pp 44-46.
(13) Stern, R., G. Hillion, etc, Process for the production of esters from vegetable oils or animal oils alcohols, U.S. Pat. No. 5,908,846, 1999.
(14) Suppes, G. J., Dasari M. A., Doskocil E. J., Mankidy P. K. and Goff M. J., Transesterification of soybean oil with zeolite and metal catalyst, Appl. Catal. A: General, 2004, 257, 213-223.
(15) Shimada Y., Watanabe Y., Sugihara A. and Tominaga Y., Enzymatic alcoholysis for biodiesel fuel production and application of the reaction to oil processing, J. Mol. Catal. B: Enzymati, 2002, 17, 133-142.
(16) Dubé, M. A.; Tremblay, A. Y.; Liu, J. Biodiesel Production Using a Membrane Reactor, Biores. Tech., 2007, 93, 639.
(17) Antolin, G., Tinaut, F. V., Briceno, Y., Castano, V., Perez, C., and Ramirez, A. I., Optimization of biodiesel production by sunflower oil transesterification, Bioresource Technology, 2002, 83, 111-114.
(18) Dubé, M. A.; Zheng, S.; McLean, D. D.; Kates, M. A Comparison of Attenuated Total Reflectance-FTIR Spectroscopy and GPC for Monitoring Biodiesel Production, J. Am. Oil Chem. Soc., 2004, 81, 599-603.
(19) Cao P., Tremblay A. Y., Dubé M. A., Morse K., Effect of Membrane Pore Size on the Performance of a Membrane Reactor for Biodiesel Production, Ind. Eng. Chem. Res., 2007, 46, 52-58.
(20) Vicente, G.; Martînez, M.; Aracil, J.; Esteban, A. Kinetics of Sunflower Oil Methanolysis, *Ind. Eng. Chem. Res.*, 2005, 44, 5447-5454.
(21) Lotero, E., Goodwin, J. G., Bruce, D. A., K. Suwannakarn, Y. Liu and D. E. Lopez, The Catalysis of Biodiesel Synthesis, Catalysis, 2006, 19, 41-83.
(22) Zhang, D., Crystallization characteristics and fuel properties of tallow methyl esters, Master thesis, Food Science and Technology, University of Nebraska-Lincoln, 1994.
(23) Zhang, Y., M. A. Dubé, D. D. McLean and M. Kates, Biodiesel production from waste cooking oil. 1. Process design and technological assessment, Bioresour. Technol., 2003, 89, 1-16.
(24) Barnwal, B. K., Sharma, M. P., Prospects of Biodiesel production from vegetable oils in India, Renew Sust Energy Rev, 2005, 9, 363-78.
(25) Cao, P.; Dubé, M. A.; Tremblay, A. Y. Methanol Recycling in the Production of Biodiesel in a Membrane Reactor. *Fuel.* 2008, 87, 825-33

What is claimed is:

1. A method of producing a fuel or fuel additive comprising:
   mixing triglyceride and an alcohol as an oil-in-alcohol emulsion together with a catalyst, forming a reaction mixture for converting the triglyceride to said fuel or fuel additive;
   reacting the triglyceride and alcohol in the presence of the catalyst by continuously circulating said reaction mixture in a continuous loop reactor, to produce said fuel or fuel additive; and
   flowing the reaction mixture past a cross-flow selective membrane in the continuous loop reactor, said selective membrane permitting passage of said fuel or fuel additive while excluding passage of triglyceride, to continuously remove from the reaction mixture said fuel or fuel additive formed in the step of reacting, while retaining unreacted triglyceride within the reaction mixture in the continuous loop reactor;
   wherein said catalyst is present in the reaction mixture at a concentration below a conventional concentration of 1.0 wt %.

2. The method of claim 1, additionally comprising regularly repleting triglyceride, methanol and catalyst to the reaction mixture.

3. The method of claim 2, wherein regularly repleting triglyceride, methanol and catalyst comprises continuous addition or periodic addition to the reaction mixture.

4. The method of claim 1, wherein the step of continuously removing from the reaction mixture said fuel or fuel additive comprises removing a methanol-containing phase from the reaction mixture.

5. The method of claim 4, wherein removing a methanol-containing phase comprises removal of methanol and/or catalyst for re-use.

6. The method of claim 1, wherein the catalyst is present at a concentration that is 10 fold to 33 fold lower than the conventional concentration.

7. The method of claim 1, wherein:
the catalyst is present at about 0.05 wt % during a retention time of 1 hour, or
the catalyst is present at about 0.03 wt % during a retention time of 2 hours.

8. The method of claim 1, wherein the step of reacting occurs at a temperature of about 65° C.

9. The method of claim 1, wherein said catalyst is a strong mineral base.

10. The method of claim 1, wherein the catalyst is sodium hydroxide, sodium methoxide, potassium methoxide, potassium carbonate, potassium hydroxide, or a combination of these.

11. The method of claim 1, wherein the catalyst is a non-hydroxide based catalyst.

12. The method of claim 1, wherein the catalyst is a heterogeneous catalyst held within a fixed bed within a reactor loop.

13. The method of claim 11 wherein the catalyst is a methoxide.

14. The method of claim 13 wherein the methoxide catalyst is present at 0.25 wt % on a triglyceride basis.

15. The method of claim 1, wherein the alcohol comprises methanol or ethanol.

16. The method of claim 1, wherein the step of reacting comprises transesterification of the triglyceride to form fatty acid alkyl esters (FAAE).

17. The method of claim 16, wherein the step of reacting comprises transesterification of the triglyceride to form fatty acid methyl esters (FAME).

18. The method of claim 16, wherein flowing the reaction mixture past a cross-flow selective membrane in the continuous loop reactor to continuously remove from the reaction mixture said fuel or fuel additive comprises removal of fatty acid methyl esters (FAME).

19. The method of claim 1, wherein flowing the reaction mixture past a cross-flow selective membrane in the continuous loop reactor to continuously remove from the reaction mixture said fuel or fuel additive comprises removal of fatty acid alkyl esters (FAAE).

20. A method of producing fatty acid alkyl esters, comprising:
mixing triglyceride and an alcohol as an oil-in-alcohol emulsion together with a catalyst, forming a reaction mixture for converting the triglyceride to said fatty acid alkyl esters;
reacting the triglyceride and alcohol in the presence of the catalyst by continuously circulating said reaction mixture in a continuous loop reactor, to produce said fatty acid alkyl esters; and
flowing the reaction mixture past a cross-flow selective membrane in the continuous loop reactor, said selective membrane permitting passage of said fatty acid alkyl esters while excluding passage of triglyceride, to continuously remove from the reaction mixture said fatty acid alkyl esters formed in the step of reacting, to produce said fatty acid alkyl esters; while retaining unreacted triglyceride within the reaction mixture in the continuous loop reactor;
wherein said catalyst is present in the reaction mixture at a concentration below a conventional concentration of 1.0 wt %.

* * * * *